US012630486B2

(12) United States Patent (10) Patent No.: US 12,630,486 B2
Thompson et al. (45) Date of Patent: May 19, 2026

(54) MULTI-PURPOSE LIGNIN-CARBOHYDRATE BINDING SYSTEM

(71) Applicant: OMS Investments, Inc., Los Angeles, CA (US)

(72) Inventors: Harold E. Thompson, Los Angeles, CA (US); Toula Xenikis, London, OH (US); Domini Upton, Dublin, OH (US); Keith Cochran, Florence, AL (US)

(73) Assignee: OMS Investments, Inc., Los Angeles, CA (US)

( * ) Notice: Subject to any disclaimer, the term of this patent is extended or adjusted under 35 U.S.C. 154(b) by 0 days.

(21) Appl. No.: 17/244,455

(22) Filed: Apr. 29, 2021

(65) Prior Publication Data

US 2021/0261477 A1      Aug. 26, 2021

Related U.S. Application Data

(63) Continuation of application No. 14/110,350, filed as application No. PCT/US2012/032596 on Apr. 6, 2012, now abandoned.

(60) Provisional application No. 61/472,486, filed on Apr. 6, 2011.

(51) Int. Cl.
| | |
|---|---|
| *C05G 5/12* | (2020.01) |
| *A01N 25/12* | (2006.01) |
| *C05D 3/02* | (2006.01) |
| *C05F 11/02* | (2006.01) |
| *C05G 3/60* | (2020.01) |
| *C05G 5/00* | (2020.01) |
| *C05G 5/30* | (2020.01) |

(52) U.S. Cl.
CPC ............... *C05G 5/12* (2020.02); *A01N 25/12* (2013.01); *C05D 3/02* (2013.01); *C05F 11/02* (2013.01); *C05G 3/60* (2020.02); *C05G 5/30* (2020.02); *C05G 5/45* (2020.02)

(58) Field of Classification Search
CPC ... C05G 5/12; C05G 3/60; C05G 5/30; C05G 5/45; A01N 25/12; C05D 3/02; C05F 11/02
See application file for complete search history.

(56) References Cited

U.S. PATENT DOCUMENTS

| | | | | |
|---|---|---|---|---|
| 3,223,518 A | ‡ | 12/1965 | Hansen | B01J 2/006 |
| | | | | 71/64.07 |
| 4,019,890 A | ‡ | 4/1977 | Fujita et al. | B01J 2/006 |
| | | | | 71/64.11 |
| 4,259,361 A | * | 3/1981 | Procter | A23L 13/10 |
| | | | | 426/453 |

| | | | | |
|---|---|---|---|---|
| 4,549,897 A | ‡ | 10/1985 | Seng et al. | C08C 1/04 |
| | | | | 504/101 |
| 4,954,134 A | ‡ | 9/1990 | Harrison | B01J 2/28 |
| | | | | 106/773 |
| 5,139,555 A | ‡ | 8/1992 | Freepons | B01J 2/28 |
| | | | | 71/25 |
| 5,186,732 A | ‡ | 2/1993 | Thompson et al. | C05G 5/37 |
| | | | | 71/64.11 |
| 5,411,945 A | ‡ | 5/1995 | Ozaki | A24B 15/14 |
| | | | | 106/162.1 |
| 7,635,404 B1 | ‡ | 12/2009 | Devic | A01N 25/12 |
| | | | | 71/11 |
| 7,776,125 B2 | ‡ | 8/2010 | Thompson | C05G 3/30 |
| | | | | 71/64.12 |
| 2007/0280981 A1 | ‡ | 12/2007 | Birthisel | A01N 25/12 |
| | | | | 424/405 |
| 2008/0051290 A1 | ‡ | 2/2008 | Johnston | A01N 25/12 |
| | | | | 504/367 |
| 2009/0013743 A1 | ‡ | 1/2009 | Lynch | A01N 25/14 |
| | | | | 71/17 |
| 2009/0110707 A1 | ‡ | 4/2009 | Winowiski | A01N 25/30 |
| | | | | 424/405 |
| 2009/0241624 A1 | * | 10/2009 | Audet | C09K 17/40 |
| | | | | 71/15 |
| 2009/0258786 A1 | ‡ | 10/2009 | Pursell et al. | A01N 25/12 |
| | | | | 504/358 |

FOREIGN PATENT DOCUMENTS

| | | | |
|---|---|---|---|
| DE | 102008031294 | ‡ | 1/2010 |
| DE | 102008031294 A1 | | 1/2010 |
| FR | 2513542 | ‡ | 4/1983 |
| FR | 2513542 A1 | | 4/1983 |
| GB | 2112765 | ‡ | 7/1983 |
| GB | 2112765 A | | 7/1983 |
| JP | 60016888 A | | 1/1985 |
| JP | 01172291 A | | 7/1989 |
| JP | 07277868 A | | 10/1995 |
| JP | 2000201631 A | ‡ | 7/2000 |
| JP | 2004182549 A | | 7/2004 |
| JP | 2010120814 A | | 6/2010 |
| WO | 9505077 A1 | | 2/1995 |
| WO | WO-95/05077 | ‡ | 2/1995 |
| WO | 1995022253 A1 | | 8/1995 |

(Continued)

OTHER PUBLICATIONS

JP2000201631A, machine english translation of document from IDS (Year: 2000).*

(Continued)

*Primary Examiner* — Mina Haghighatian
(74) *Attorney, Agent, or Firm* — Frost Brown Todd LLP

(57) ABSTRACT

A granule includes (i) particles comprising an active agent and (ii) a binding agent comprising a lignosulfonate and a mixture of polyols. A ratio of lignosulfonate to the mixture of polyols is in the range of 1.5:1 to 16:1. The mixture of polyols may include monosaccharides, disaccharides, hydrogenated starch hydrolysates, or combinations thereof. The active agent may be an agriculturally active agent, a pharmaceutically active agent, or a food product. The granule may have a sphericity of at least 85%.

12 Claims, 9 Drawing Sheets

(56) References Cited

FOREIGN PATENT DOCUMENTS

| WO | WO-9522253 A1 * | 8/1995 | ............ A01N 25/22 |
| WO | 9724362 A1 | 7/1997 | |
| WO | WO-97/24362 ‡ | 7/1997 | |
| WO | WO-WO-9836737 A1 ‡ | 8/1998 | |
| WO | 02082902 A2 | 10/2002 | |
| WO | WO-02/082902 ‡ | 10/2002 | |

OTHER PUBLICATIONS

Briggs (J. of Agri. Res., 1943, 67(9), 359-367) (Year: 1943).*
Ullman (Ullman's encyclopedia of industrial chemistry, 2009, Fertilizers, 2. Types, v. 14, p. 200-240) (Year: 2009).*
Supplementary European Search Report issued in corresponding Application No. EP 12 86 5101, dated Mar. 13, 2015.‡
XP55176252, Anonymous, International Starch Polyols (Mar. 13, 2015) (2 pages).‡
Corn syrup (obtained online via Wikipedia on Mar. 17, 2018).‡
Molasses (obtained online via Wikipedia on Mar. 17, 2018).‡

Kimura light e Kyoto University Faculty of Agriculture, Food Engineering Department, KAGAKU to SEIBTUSU Online Journal (Japan Society for Bioscience, Biotechnology and Agrochemistry) (1969) vol. 7, No. 7, pp. 394-399.
Entry, James A. et al., "Matrix-Based Fertilizers Reduce Nutrient Leaching While Maintaining Kentucky Bluegrass Growth," Water Air Soil Pollution (2010) vol. 207, Nos. 1-4, pp. 181-193.
International Search Report and Written Opinion of the International Searching Authority issued in PCT/US12/32596, mailed Aug. 31, 2012.
Supplementary European Search Report issued in corresponding European Application No. 12 86 5101, dated Mar. 13, 2015.
Decision to Grant issued in corresponding European Application No. 12 86 5101, dated Dec. 8, 2016.
Communication from the Examining Division issued in corresponding European Application No. 12865101, dated Dec. 11, 2015 (5 pages).
Supplementary European Search Report and Opinion issued in corresponding European Application No. 12865101, dated Mar. 27, 2015 (9 pages).

* cited by examiner
‡ imported from a related application

MULTI-PURPOSE LIGNIN-CARBOHYDRATE BINDING SYSTEM

CROSS-REFERENCE TO RELATED APPLICATIONS

This application is a continuation of U.S. patent application Ser. No. 14/110,350, filed Mar. 21, 2014, which is a national stage application under 35 U.S.C. § 371 of International Patent Application No. PCT/US2012/032596, filed Apr. 6, 2012, which claims priority to U.S. Provisional Application No. 61/472,486, filed Apr. 6, 2011, the disclosures of which are each hereby incorporated herein by reference in their entireties.

BACKGROUND OF THE INVENTION

Granulation of fertilizers and other components using binders is well known. Binders are used to adhere fertilizers and other components together into a single particle. Conventional binders do not contribute either economical or practical value to the fertilizer formulations. Thus, it is a cost ineffective component. In some cases, the use of a binder in a fertilizer composition also results in a granular fertilizer that is insufficiently hard and/or round. These granular fertilizers make encapsulation with polymers or resins difficult, resulting in inconsistent slow release fertilizers.

The prior art discloses many binder systems. These binders only contribute to the agglomeration of dispersed fertilizer fines and particles. Additionally, these binders constitute a significant portion of the fertilizer composition, resulting in a fertilizer with reduced nutrient value. Due to these shortcomings, fertilizers using conventional binders result in products with low commercial viability.

Thus, there is a need in the art to provide a binding system which not only serves the purpose of agglomerating fines and particles together, but also provides some other practical use.

SUMMARY OF THE INVENTION

The objective of this invention is to provide a new binding formulation and a processing methodology for manufacture of fertilizer particles that overcome these limitations.

The present invention relates to a novel, dual purpose binder formulation or system. More particularly, the invention provides a binding formulation that agglomerates or binds dispersed particles or fines into a granular composition having desired properties such as increased granule hardness or crush resistance, increased roundness or sphericity, and increased durability and uniformity. The binding formulation also serves as an in situ chelating agent for micronutrients and also allows for single-stage granulation processing.

In one embodiment, dispersed particles or fines is comprised of an active agent, such as a fertilizer, are agglomerated or bound together with a binder formulation comprising a lignin-based binder and a carbohydrate based binder. This combination of binders results in granules having increased hardness or crush resistance, increased sphericity or roundness, and increased durability. These enhanced properties are due, in part, to the synergistic effects of combining binders made of lignin based materials and carbohydrates. Thus, in one embodiment, the lignin-based material is a lignosulfonate, and the carbohydrate is a mixture of polyols, such as a blend of monosaccharides and disaccharides. In another embodiment, the mixture of polyols may comprise sorbitol, maltitol, hydrogenated starch hydrolysates ("HSH"), or combinations thereof.

In another embodiment, the invention provides a process of agglomerating dispersed particles or fines into substantially spherical and crush resistant granules. The agglomeration process may be achieved by a single-stage process comprising atomizing and spraying a specific ratio of lignin-based materials and carbohydrate binder, such as a polyol mixture, into an agitating bed containing particles or fines. This single-stage process allows intimate mixing of the particles or fines with the novel binder to achieve an improved granule. The process may additionally comprise a recycling step, where undersized granules are reintroduced into the agitating bed until the desired granule size is achieved. The ratio of lignin to carbohydrate, such as a polyol, may vary depending on the solubility of the particles to be agglomerated. The resulting product achieves the desired properties of increased hardness or crush resistance, increased sphericity or roundness, and increased durability. These enhanced properties are due to the synergistic effects of combining the novel binder formulation and the single-stage processing method.

In yet another embodiment, the invention provides a method of covering a seed and binding the seed with a material mixture beneficial for seed germination. This method may be used to produce an "all-in-one" seed product that is capable of germination upon appropriate hydration and exposure to sufficient sunlight. The material mixture comprises a soil conditioner that allows sufficient air transport to the seed, a fertilizer, and a general purpose soil enhancer. The seed and material mixture are bound together using the binding formulation of the invention, which comprises a specific ratio of lignin-based material and a carbohydrate binder. In one embodiment the carbohydrate binder is a mixture of polyols. The combination of the lignin and polyol produces an agglomerated particle which is substantially spherical and resistant to crushing. In addition, the agglomerated particle is a self-contained granule capable of germinating, when properly hydrated and exposed to sufficient sunlight, without the need for additional fertilizers or micronutrients. The resultant granule may additionally comprise micronutrients, such as but not limited to calcium, magnesium, sulfur, boron, copper, iron, chloride, molybdenum, zinc, or combinations thereof. In one embodiment, the seed may be grass, vegetable, or flower seed. In one specific embodiment, the self-contained grass seed or "all-in-one" grass seed is capable of germinating grass, when properly hydrated and exposed to sufficient sunlight, without the need for additional mulching or fertilizers.

In yet another embodiment, the active agent included in the granules may be a fertilizer, such as urea. It has been unexpectedly discovered that the novel binder formulation of the instant invention, when used in conjunction with urea produces an anti-caking effect.

In yet another embodiment, the invention provides a method of cultivating a seed comprising the distribution of the covered seed with a material mixture beneficial for seed germination.

DETAILED DESCRIPTION OF THE INVENTION

Figure 1:
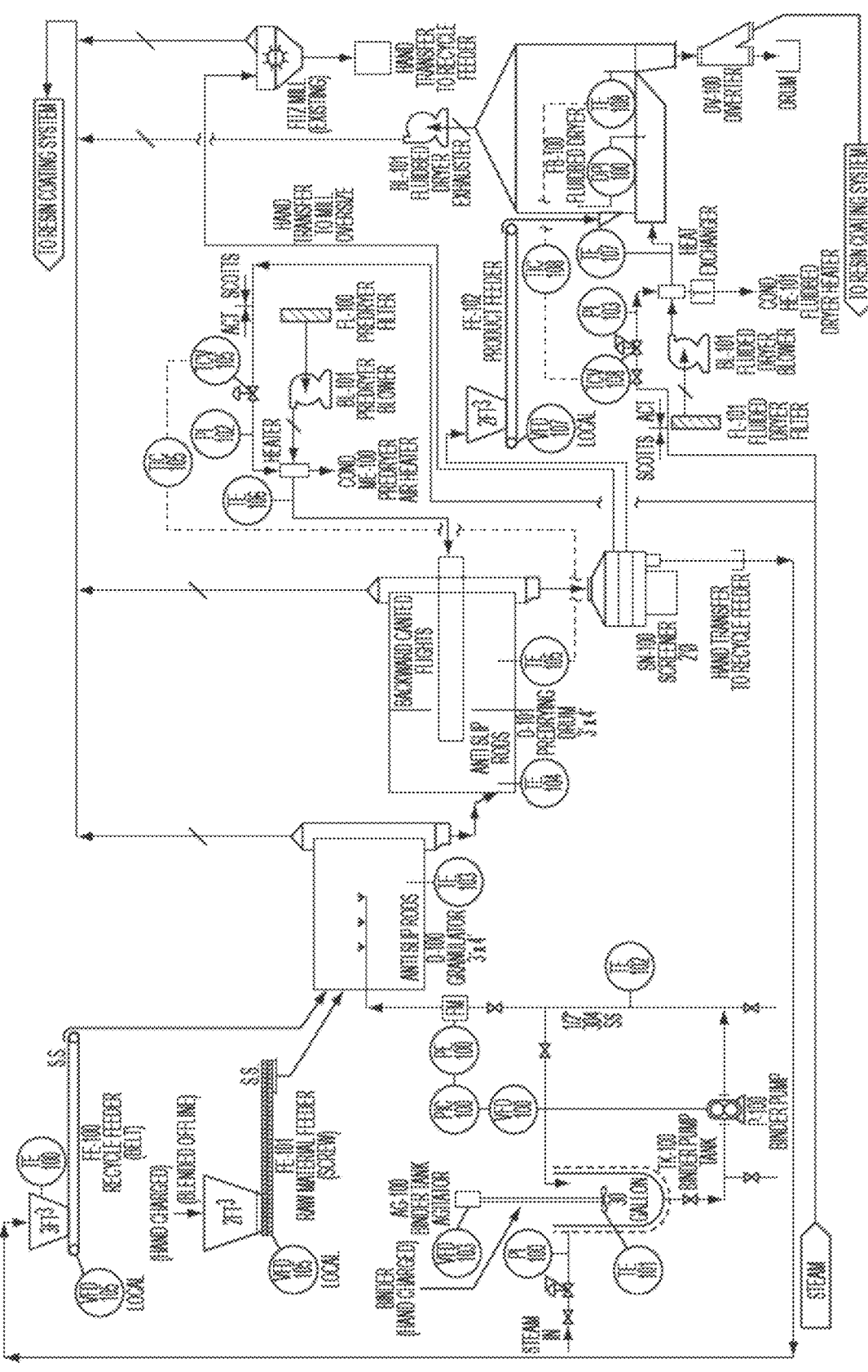
FIG. 1 depicts a schematic of a process flow diagram of the invention.
Figure 1:
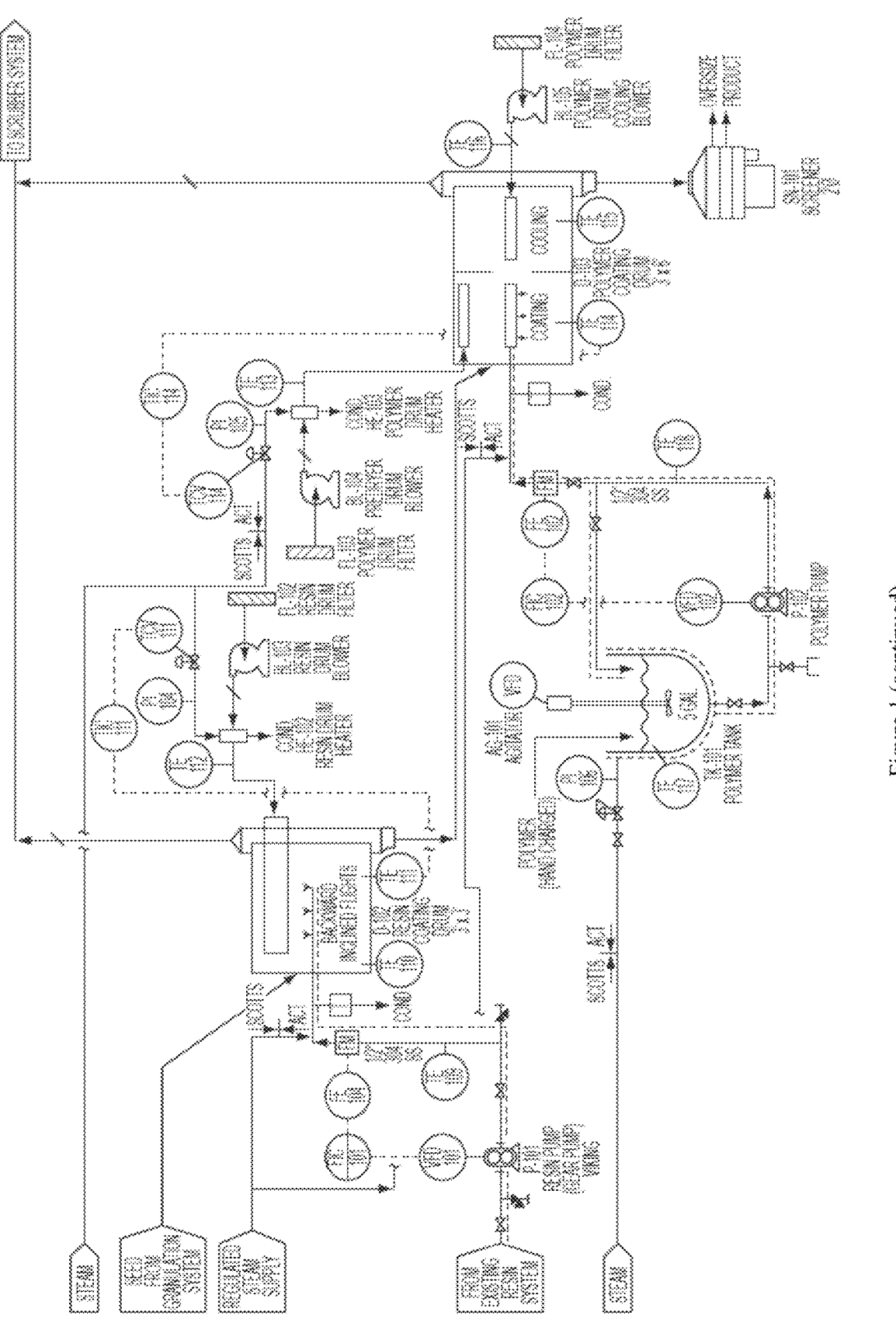

The present invention provides a composition, a method of making a composition and a method of using a composition comprising an agglomerated particle using a novel dual binder formulation or system. The binder formulation produces granules achieving desired properties such as increased particle hardness, increased crush resistance, increased roundness (i.e., sphericity), and increased durability and uniformity. These granules are produced utilizing a single-stage granulation process. The granules produced by this method may also be water soluble.

The binder system of the invention includes a lignin or lignin-derived material and a mixture of polyols, each present at a ratio sufficient to generate granules with the desired properties. The ratio of the lignin to polyols used in the binder system is dictated by the solubility of the particles or fines to be agglomerated. "Solubility" of a particle or fine used in the formulation is directly related to a formula's tendency to form agglomerated particles or granules. The more soluble the particle or fine, the lower the ratio of lignin to polyols. The less soluble the particle or fine, the higher the ratio of lignin to polyols.

Unlike conventional binders, the binding formulation does not use hazardous chemicals such as formaldehyde and other petroleum-based products. The dual binder formulation or system of the invention uses natural and renewable by-products. As such, the binder formulation does not include hazardous chemicals such as, but not limited to, formaldehyde, petroleum-based chemicals, carbonate, sulfate, silicate strengthener, dextrin, maltodextrin, cyclodextrin, pectin, soy lecithin, agar, corn starch, plantain starch, pre-gelatinized starch, or sodium starch glycolate, nor does it include other polymer-based binders such as, but not limited to, polyethylene (PE), polypropylene (PP), or polyethyl glycol (PEG). The binder formulation of the invention also does not include pharmaceutical binders such as, but not limited to, hydroxyl methyl cellulose, hydroxypropyl methyl cellulose, ethoxylated stearyl alcohols, lactose, polyvinylpyrrolidone, methyl cellulose, polyethylene glycol, microcrystalline cellulose, soybean oil, cottonseed oil, gelatin, or sucrose.

Lignins, which are by-products of the wood pulping process, are converted into lignosulfonates or sulfonated lignins. The lignosulfonates of the binder formulation contribute to granules hardness, roundness, and uniformity. Polyols are derived from traditional corn syrups, and act as tackifying agents that contribute to the speed and efficiency of the particle or fine granulation process. This reduces the need for multi-stage processes.

The novel binder formulation of the invention allows for intimate mixing of dispersed particles or fines, such as fertilizers, micronutrients, soil conditioners, inert carriers, pesticides, plant growth hormones, plant growth regulators, soil moisture enhancers, seeds, and wetting agents. By utilizing a significantly lower quantity of the novel binding formula, the fertilizer granules produced possess increased nutritional value while simultaneously increasing hardness, roundness, sphericity, and crush resistance. In one embodiment, the invention provides a binding formulation comprising less than about 15%, between 3% and 12%, or approximately 5-6% of the total weight of the agglomerated granule.

The invention further permits intimate mixing of dispersed particles or fines, such as fertilizer and micronutrients (e.g., iron) into an agglomerated granule. An added advantage of the invention is the in situ chelation of micronutrients (e.g., iron sulfate and other metal sulfates) when admixed with the novel binder. This advantage allows for single-step granulation without the need for an added chelation step. The chelation of micronutrients, prevents oxidation, thereby optimizing the absorption of the micronutrients by plants.

As contemplated by the invention, lignins or lignin-derived materials are defined as materials recovered from the wood pulping process. Lignin or lignin-derived materials may include lignosulfonates and salts thereof. The source of lignins is well known in the art and include any conventional cellulosic material such as hardwood and softwoods. Lignosulfonates are recovered from the sulfite preparation of wood pulp. The lignosulfonates may include calcium lignosulfonate, sodium lignosulfonate, ammonium lignosulfonate, magnesium lignosulfonate, aluminum lignosulfonate, potassium lignosulfonate, or zinc lignosulfonate. The lignin or lignosulfonate content in the binder system is based on the solubility of the particles or fines. In another embodiment, the lignin or lignosulfonate will represent about 5-6% of the total weight of the binding formulation.

The carbohydrate portion of the binding formulation enhances the sphericity and results in fewer process losses. The spherical nature of granules is measured by "sphericity," which is defined as the degree a given particle shape approximates a perfect sphere. The closer the fractional number is to 1.00, the more spherical the particle shape. This value is measured using an optical particle size characterization instrument such as the Camsizer®, marketed in the US by Horiba Instruments. Formulations that are difficult to granulate tend to adhere to equipment rather than agglomerate with the other particles or fines. This property can reduce overall granule roundness and hardness, while increasing the proportion of undersized granules or fines that require recycling back into the granulator. The addition of carbohydrates such as polyols or 'sugar alcohols' to the binder solution mixture significantly resolves these granulation problems.

"Polyols" or "mixture of polyols" include traditional corn syrups that undergo a catalytic hydrogenation process or other related process. The polyols may include a mixture of monosaccharides, disaccharides, long chain polymeric polyols, which are also known as polyglycitol syrups or HSH, or combinations thereof. The monosaccharides may include mannitol, dulcitol, iditol, or sorbitol. The disaccharides may include isomalt, lactitol, polyglycitol, or maltitol. The polyol should be formulated in the binder solution at a rate of 5% to 75%, or 10% to 20% or 6% to 20% of the weight of the main binder solution solids weight, for formulations having solubilities greater than 10 g/100 at 20° C. The composition of the polyol should contain less than or equal to 15%, or may contain less than or equal to 10% of monosaccharides, less than or equal to 20%, preferably less than or equal to 15% of disaccharides, and greater than 50%, preferably greater than 65% HSH. In one embodiment of the invention, the polyols contain at least 15% monosaccharides, 20% disaccharides, and 65% HSH. In another embodiment, the polyols may include 15% sorbitol, 20% maltitol, and 65% HSH.

The ratio of lignin or lignosulfonate to polyol may be adjusted to accommodate a wide range particle agglomeration solubilities. Generally, particles with higher solubility (i.e., having a greater tendency to form granules), require less polyol in the granulation process. However, particles having lower solubility (i.e., having a lower tendency to form granules), require the use of higher levels of polyols to maintain efficient granulation. Thus, in one embodiment, particles with solubility of less than about 0.3 grams per 100 ml of water at 20° C. may have a ratio in the range of approximately 1.5:1 to about 4:1 of lignin-derived material to a mixture of polyols. In another embodiment, particles with a solubility of greater than about 10 grams per 100 ml of water at 20° C. may have a ratio in the range of approximately 5:1 to about 16:1.

Table 1, below, shows the relative ratio of polyol required for a given formulation solubility.

ticles which have been agglomerated into a granule may have sphericity percentages greater of at least 85%, more preferably 87%, 88%, 89%, 90%, 91%, or 93%. The aspect ratios are greater than 0.78, more preferably, 0.8, 0.83, 0.87. The agglomerated particle will also have a resistance to crushing which is capable of exceeding approximately 2.0 Lbs. force.

Because the granules generated by the invention have greater sphericity, hardness and aspect ratios, the granules produced are more effective for polymer or resin coatings. This allows for the production of consistent controlled release water soluble granule.

These properties allow granules produced by this invention to be used as substrates for encapsulation. The coating which encapsulates the granule may be a sulfur-based coating, a solvent-based polymer coating, or water-based latex coating. In one embodiment, the intermediate coating is a water-based latex coating. The latex coating can be selected from polymeric insoluble latex materials, wherein the material comprises copolymer blends of polyvinylidene chloride or ethylenically unsaturated co-monomers such as methyl methacrylates, acrylonitriles, and methyl acrylates, and mix-

TABLE 1

| Pilot Plant Trial Number | Product Description | Average Formula Solubility in Water, g/100 @ 20 C. | Ligosulfonate:HSH Ratio, based on Solids |
|---|---|---|---|
| MC09-238-A | Fertilizer + Soil Conditioner | 10.74 | 10:1 |
| MC09-196-A | Fertilizer + Iron | 16.93 | 5:1 |
| MC09-224-A | Lawns Fertilizer | 11.59 | 10:1 |
| MC10-020-A | Lawns Fertilizer | 76.1 | 16:1 |
| MC09-287-A | All-In-One Grass Seed, Rice Hulls | 0.26 | 3:1 |
| MC09-294-A | All-In-One Grass Seed, Rice Hulls | 0.26 | 4:1 |
| MC10-076-A | All-In-One Grass Seed, Perlite | 0.26 | 2:1 |
| MC10-132-A | All-In-One Grass Seed, Perlite | 0.26 | 1.5:1 |

In one embodiment, the ratio of lignosulfonate to polyol is at least 1.5:1. In another embodiment, the ratio of lignosulfonate to polyol is within the range of approximately 1.5-10:1. In yet another embodiment the ratio of lignosulfonate to polyol may include 2:1, 3:1, 4:1, 5:1, 10:1, or 16:1.

As a result of the binding formulation comprising a specific ratio of lignin and polyols, the agglomerated particles have the physical property of being substantially spherical and retaining significant resistance to crushing. These physical characteristics are the direct result of the process of agglomerating the particles in combination with the specific ratio of lignin and polyols applied to small and fine sized particles. The process allows for small under-size particles to be recycled back into a granulating apparatus at a rate of 2-3 times the rate of freshly added particles. The recycling process aids in the granulation process by allowing under-sized particles to gradually accumulation in particle size, without sacrificing granule properties. The combination of a preferred binder formula, the application techniques and processing steps, such as recycle rate ratios gives rise to the above-cited desirable properties of the granules of the present invention.

The initial particle sizes used in the agglomeration process may vary. In one embodiment, fine or powdered sized particles are the starting material. These particles can be in the size range of about 20-40 Size Guide Number ("SGN"). In another embodiment, the SGN may range from about 4-10 SGN, if smoother particle surfaces are desired. Partures thereof. The latex layer is capable of controlling the rate of inner core release, based on the weighting and thickness of the polymeric coating. The granules may also be encapsulated with molten methylene urea resin, molten sulfur, molten waxes, polyurethane resins, alkyd resins, as well as other polymer systems. Solvent-based polymers that may be used in the invention are described, for example, in U.S. Pat. Nos. 4,019,890 and 3,223,518, which are incorporated herein by reference. U.S. Pat. Nos. 4,549,897 and 5,186,732 provide examples of various water-based polymers coated in the absence of solvents, and provide for a safe and cost effective alternative, both of which are incorporated herein by reference.

The particles, particulates, or particulate matter of the invention may include any material desired to be agglomerated into a pellet, cake, prill, spheroid tablet, pastille, or flake. The particle generally refers to the active agents bound together, with other components, to form a granular composition. These particles may include agriculturally active materials such as fertilizers, pesticides, soil conditioners or agents, seeds, rice hulls, acaricides, avicides, bactericides, biocides, germicides, rodenticides, vulpicides, nutrient, pesticides, herbicides, fungicides, growth regulators, insecticides, animal and insect repellants, antibiotic, defoliants, pH adjustors, soil conditioners, molluscicides, and mixtures or combinations thereof. Additionally, particle, particulate, or particulate matter may refer to materials used in pharmaceutical compositions such as drugs, vitamins, or other supplements. More still, particle, particulate, or particulate matter may refer to materials used in the preparation of food products such as but not limited to, granulated cereals, candies, spices, nuts, and meats. The term particle, particulate, or particulate matter will generally not include other components of the granular composition such as the lignin-derived material and the mixture of polyols.

In another embodiment the particle may include a fertilizer, nutrient, pesticide, herbicide, fungicide, growth regulator, insecticide, animal and insect repellent, antibiotic, or combinations thereof. In another embodiment, the agricultural product is a fertilizer. In a particular embodiment, urea particles combined with the novel binder of the invention exhibit unique anti-caking effects. The polyol component of the binder system provides the unexpected benefit of inhibiting caking or clumping in urea-containing fertilizers by reducing the aspect ratios of the crystals formed in the fertilizer, such that the levels effectively eliminate caking in a treated fertilizer. The details of this benefit are outlined in U.S. Pat. No. 7,776,125, which is hereby incorporated by reference.

In yet another embodiment of the invention, the particle may also include various seeds, such as grass, vegetables, flowers, or grains. The agglomerated product may also be envisioned as an "all-in-one" seed product, which comprises fertilizer, soil conditioning agents, micronutrients, seed, perlite (or materials having similar open pore space in their physical composition such as synthetic expanded materials, coir, and diatomaceous earth), and optionally a bulk density materials (e.g., limestone, calcium carbonate, calcium sulfate, dolomite, marble, powdered granite, or combinations thereof), and which may be subsequently encapsulated by a protective coating. This all-in-one seed product requires only the addition of water and sufficient sunlight to initiate growth.

Thus, in one embodiment, the all-in-one-seed product is a granular product that comprises (i) particles comprised of a viable seed, soil conditioning agents, fertilizers, micronutrients, soil moisture enhancers, oxygen enhancers, growth enhancers, hormones, and fungicides, and mixtures thereof; and (ii) a binding agent comprising a lignin and a mixture of polyols in a ratio sufficient to agglomerate the particle into a spherical and crush resistant granular product. The ratio of lignin and polyol in the binding agent will be determined by the solubility of the various particles. In one embodiment the ratio of the lignin and the polyols in the binding agent is about 1.5:1 to about 4:1 when the solubility is less than about 0.3 g/100 ml of water at 20° C. Surprisingly, the aggregation or agglomeration of fertilizer, micronutrients, grass seed, perlite (or materials having similar open pore space in their physical composition such as synthetic expanded materials, coir, and diatomaceous earth), into an all-in-one granule product produced greater than expected results when compared to other an all-in-one grass seeds products using rice hull. In another embodiment, the addition of a bulk density material to the all-in-one granule provides surprisingly more granule hardness, sphericity, and germination rates. Bulk density materials added at a volumetric ratio of perlite to heavy bulk density material in the range of about 1:1 to 4:1. In one embodiment the ratio is 3:1 perlite to bulk density material.

The addition of a "bulk density material" provides for a final granule with improved hardness and spreadability when used in a rotary spreader or other broadcasting devices that distributes materials over a larger area. The bulk density material also improves the overall efficiency in the granulation product by providing an aide or a substrate onto which the agglomeration process may occur. By utilizing its weight, the bulk density material allows for faster agglomeration rate by helping to roll up the seed and binder into granules, thereby and enhancing the formation of a spherical shape. When added at a rate of 5-20% by weight at the appropriate particle size distribution, the ability to improve the efficiency of agglomeration, hardness, and sphericity is achieved.

The bulk density material may be any heavy material in the range of about 55 to 75 Lbs/cu Ft. (e.g., 60 to 70 Lbs/cu Ft.) In one embodiment, the bulk density material is selected from limestone, calcium carbonate, calcium sulfate, dolomite, marble, powder granite or any combination thereof.

The agglomeration rate and the formula's overall binder utilization efficiency is a direct function of the heavy bulk density material's particle size distribution. If the particle size distribution of bulk density material is too large, significantly more binder solution is required to roll up spherical granules. This can increase cost of the formula, while potentially reducing product performance. Thus, in one embodiment, the particle size distribution should have to least 99% of the material weight with a size less than 44 microns, with 30-70% of that weight having a particle size less than 5 microns, while also being larger than 1 micron. Using materials having larger particle size distribution slows down the granulation process and requires the use of greater amounts of binder solution. Also the use of excess binder increases production costs. Also contemplated in the invention is a process of manufacturing an agglomerated particle to generate granules with increased crush resistance and sphericity. The process involves the atomization of a specific ratio of lignin to polyol such that the binder solution is intimately mixed with the particles. The viscosity of the binder solution is in the range of 10-20 cps at 25° C. The atomization provides an intimate mixing of components with the added benefit of minimizing the amount of binder applied to the particles. By utilizing a binder, such as calcium lignosulfonate, and formulating a fertilizer containing micronutrients, such as iron sulfate or other metal sulfates (e.g., zinc, manganese, copper, and magnesium), intimate mixing allows chelation of the lignosulfonate. The most effective chelation occurs when the weight percentage of lignosulfate used in the binder solution exceeds the weight percentage of total iron or metal by approximately 70%. Less effective chelation, which may result in oxidation, begins if the weight percentage of lignosulfate exceeds the weight percentage of iron or other metals by approximately 25%. As a result of the atomization, the binder solution is approximately 5-6% of the total weight of the final granular product.

Thus, in one embodiment, the invention provides a method of manufacturing a granular product composition of the invention comprising: (i) proving particles comprised of active agents; (ii) providing a binding agent comprising a lignin or lignin-derived material and a mixture of polyols in a ratio which is dictated by the solubility of the particles; (iii) agitating or mixing the particles for a sufficient period of time to generate a homogeneous blend; and (iv) introducing an atomized form of the binding agent through an atomized spray for at least a portion of the time the particles are agitating or mixing. The ratio of the lignin and polyol in the binding agent will vary depending on the solubility of the particles. Thus, in one embodiment, the ratio of the lignin to polyols in the binding agent is about 5:1 to 16:1 when the solubility of the particles is greater than about 10 g/100 ml at 20° C. In another embodiment, the ratio of the lignin to polyols in the binding agent is about 1.5:1 to 4:1 when the solubility of the particles is less than about 0.3 g/100 ml at 20° C.

In another embodiment, the method of manufacturing may also comprise a drying step. The times and temperature required for drying are dictated by the particular particle used in the manufacturing process. The solubility of the particle used also plays a role in the determination of the drying times and temperatures. In one embodiment, the drying times for a particle having a solubility range of 11-80 g/100 ml at 20° C. will vary from about 10 minutes to about 20 minutes. In another embodiment, the temperature of drying may also be dictated by the particular particle used in the manufacturing process. Drying temperatures ranging from 120° F. to about 185° F. will be desired with particles having a solubility range of 11-80 g/100 ml at 20° C. Particles having solubility less than 1.0 g/100 ml at 20° C. may have drying times of about 5 minutes to about 10 minutes. Drying temperatures ranging from 95° C. to about 115° C. will be desired with particles having solubilities of less than 1.0 g/100 ml at 20° C.

Mixing or agitation of the various particles in the manufacture of the granular product also plays an important role in the formation of a highly spherical and hard granular product. In order to maintain a highly spherical particle, a mixing device, such as but not limited to a drum, fluid bed, or pan, must move at a consistent speed such that the particles are moving in a continuous rolling motion. The continuous motion allows the particles to pass before the binder spray nozzle section of the mixing device, providing for even application of the binder formulation. The speed at which the particles roll is less critical than maintaining overall consistent movement. If the materials undergo intermittent motion, the relative sphericity of the granules will be compromised.

Another embodiment of the invention involves a method of fertilizing vegetation comprising adding a granule manufactured by the instant invention. Such methods may include applying to vegetation a fertilizer composition which is substantially spherical and crush resistant, comprising an agglomeration of nutrients, micronutrients, lignosulfonate, and polyols in a ratio sufficient to generate a fertilizer granule which is at least about 70%-95% spherical. In one embodiment, the fertilizer granule is about 80%-90% spherical or about 87% spherical. The spherical granule is also capable of withstanding 2 lbs/force when the lignin and polyols ratio is about 1.5:1 to about 16:1. In another embodiment, the ratio of the lignin to polyols vary depending on the solubility of the particles used in the manufacture of the granule.

Another embodiment of the invention is a method of cultivating grass comprising applying to said grass a composition comprising an agglomerated particle comprising a grass seed, perlite, nutrients, and micronutrients, wherein the particle comprises lignosulfonate and polyols in a ratio sufficient to form a particle that is at least 87% spherical and resistant to 2.0 lbs/force. The lignosulfonate and polyols are in a ratio of about 1.5:1 to about 16:1, but vary depending on the solubility of the particles used in the manufacture of the granule. The lignosulfonate may include calcium lignosulfonate, sodium lignosulfonate, ammonium lignosulfonate, magnesium lignosulfonate, aluminium lignosulfonate, or combinations thereof. The polyols may include monosaccharides, disaccharides, and HSH, which may comprise approximately 15% monosaccharides, 20% disaccharides, and 65% HSH.

Compositions according to one or more embodiments of the present invention will be further described, and advantages thereof, will be made apparent with reference to the following examples, which are provided to illustrate the practice of the invention and not to limit its scope of the invention as defined by the appended claims.

EXAMPLES (a) General Process for Preparing the Agglomerated Particles.

The granulation process is conducted at ambient temperatures and therefore can be used for fertilizer and pesticide combinations, as well as biological materials such as seed.

Granules of the invention initially require all materials in the formulation to be sized in powder form with an approximate size of 20-40 SGN. All particle components, such as fertilizers, micronutrients, seeds, and perlite are mixed together to form a relatively uniform particle blend. This blending process ensures that the mixture is thoroughly mixed. The particle blend is then feed into a granulator apparatus at ambient temperature and normal humidity.

As the mixed powder blend enters the granulator, typically a horizontal rotating drum, the binder solution (i.e., lignosulfonate and polyols) is applied at a temperature range of 110-130° F. and solution viscosity of 10-20 cps. The viscosity of the binder solution allows for atomization of the binder, thereby allowing intimate mixing with powder blend. The atomization is achieved by using air-assist spray nozzles that will deliver 10-25 SCFH of air per GPH of binder solution.

As the rolling action in the granulator creates round particles, the wet granules are then conveyed to a pre-dryer, which may also be a rotating drum. The pre-dryer removes approximately 30-50% of the moisture added from the binder solution in the granulator and operates in a temperature range of ambient to 135° F. The pre-dryer removes enough moisture to allow increased granules strength for screening. Undersized granules (i.e., fines) are recycled back into the granulator apparatus at 2-3 times the rate of fresh powder blend. The moisture level in the granulator apparatus is sufficient to allow effective adherence of the next layer of binder solution and powder blend.

Granules of the appropriate size are then dried in the fluid bed drier at a temperature range of ambient to 180° F. until a final moisture concentration 0.5-1.0% is achieved. (See FIG. 1). The finished granules can be heated in-situ and transferred to other mechanical devices for resin coating to add controlled release coatings if desired.

(B) Various Trials Involving Different Ratios and Particles Amounts

Tables 2-7 show the material ratios loaded as powder mixes into the granulator on a continuous basis at 50 lbs/hr. Each trial was then completed in the same manner as described in the previous section.

TABLE 2

| Pilot Plant Run Number MC09-084-A | | |
| --- | --- | --- |
| Solid Raw Material Feeds | Lbs/1000 | Solids Blend Ratio |
| K2SO4 | 287.38 | 30.0% |
| KCI | | 0.0% |
| ASN | 520.00 | 55.0% |
| AS | 0.00 | 0.0% |
| MAP | 90.00 | 9.0% |
| MnSO4 | | 0.0% |

TABLE 2-continued

Pilot Plant Run Number MC09-084-A

| Solid Raw Material Feeds | Lbs/1000 | Solids Blend Ratio |
|---|---|---|
| FeSO4 | 55.00 | 6.0% |
| Total Formula solids | 952.38 | |
| Binder Solution Type | Lbs/1000 | |
| Norling A + Water Solution | 216.67 | |

TABLE 3

Pilot Plant Run Number MC09-147-A

| Solid Raw Material Feeds | Lbs/1000 | Solids Blend Ratio |
|---|---|---|
| K2SO4 | 160.38 | 17.0% |
| KCI | 0.00 | 0.0% |
| ASN | 670.00 | 70.4% |
| AS | 0.00 | 0.0% |
| MAP | 82.00 | 8.6% |
| MnSO4 | | 0.0% |
| MicroMax Package | 40.00 | 4.0% |
| FeSO4 | 0.00 | 0.0% |
| Total Formula solids | 952.38 | |
| Binder Solution Type | Lbs/1000 | |
| Norling A + Water Solution | 162.50 | |

TABLE 4

Pilot Plant Run Number MC09-155-A

| Solid Raw Material Feeds | Lbs/1000 | Solids Blend Ratio |
|---|---|---|
| K2SO4 | 204.38 | 21.9% |
| KCI | 0.00 | 0.0% |
| ASN | 553.00 | 58.1% |
| AS | 90.00 | 9.0% |
| MAP | 0.00 | 0.0% |
| MnSO4 | | 0.0% |
| MicroMax Package | 0.00 | 0.0% |
| FeSO4 | 105.00 | 11.0% |
| Total Formula solids | 952.38 | 100.00% |
| Binder Solution Type | Lbs/1000 | |
| Norling A + Water Solution | 162.50 | |

TABLE 5

Pilot Plant Run Number MC09-168-A

| Solid Raw Material Feeds | Lbs/1000 | Solids Blend Ratio |
|---|---|---|
| K2SO4 | 122.38 | 12.8% |
| KCI | 0.00 | 0.0% |
| ASN | 620.00 | 65.1% |
| AS | 0.00 | 0.0% |
| MAP | 0.00 | 0.0% |
| Iron Oxide | 0.00 | 0.0% |
| MicroMax Package | 0.00 | 0.0% |
| FeSO4 | 210.00 | 22.1% |
| Total Formula solids | 952.38 | 100.00% |
| Binder Solution Type | Lbs/1000 | |
| Norling A + Water Solution | 162.51 | |

TABLE 6

Pilot Plant Run Number MC09-176-A

| Solid Raw Material Feeds | Lbs/1000 | Solids Blend Ratio |
|---|---|---|
| K2SO4 | 207.38 | 22.0% |
| KCI | 0.00 | 0.0% |

TABLE 6-continued

Pilot Plant Run Number MC09-176-A

| Solid Raw Material Feeds | Lbs/1000 | Solids Blend Ratio |
|---|---|---|
| ASN | 240.00 | 25.2% |
| AS | 0.00 | 0.0% |
| MAP | 405.00 | 42.5% |
| Iron Oxide | 0.00 | 0.0% |
| MicroMax Package | 50.00 | 5.0% |
| FeSO4 | 50.00 | 5.3% |
| Total Formula solids | 952.38 | 100.00% |
| Binder Solution Type | Lbs/1000 | |
| Norling A + Water Solution | 172.23 | |

TABLE 7

Pilot Plant Run Number MC09-196-A

| Solid Raw Material Feeds | Lbs/1000 | Solids Blend Ratio |
|---|---|---|
| K2SO4 | 203.42 | 22.0% |
| KCI | 0.00 | 0.0% |
| ASN | 575.00 | 60.9% |
| AS | 60.00 | 6.0% |
| MAP | 0.00 | 0.0% |
| Iron Oxide | 0.00 | 0.0% |
| MicroMax Package | 0.00 | 0.0% |
| FeSO4 | 105.00 | 11.1% |
| Total Formula solids | 943.42 | 100.00% |
| Binder Solution Type | Lbs/1000 | |
| Norling A + Water Solution | 199.39 | |
| Hystar 3375 | 17.33 | |

(C) a Comparison of Various Granules Produced

This example shows the resulting physical data from materials produced using the inventive methods described herein. The SGN is the average size diameter in mm times 100, the UI is the uniformity index, B/L is the aspect ratio, SPH is the sphericity divided by 100, and the Load at Rupture is the crush strength in Lbs. force. The results show that the target properties can all be met. However, larger concentrations of certain raw materials can reduce particle hardness as well as sphericity.

| Trial Number | SGN | UI | B/L | SPH | Load At Rupture |
|---|---|---|---|---|---|
| MC09-084-A | 353 | 52.3 | 0.872 | 0.933 | 5.666 |
| MC09-147-A | 298.9 | 43.1 | 0.829 | 0.917 | 3.139 |
| MC09-176-A | 192.5 | 48.8 | 0.806 | 0.896 | 2.042 |
| MC09-196-A | 238 | 52.1 | 0.784 | 0.871 | 2.313 |
| MC09-168-A | 162.8 | 48.1 | 0.771 | 0.865 | 0.576 |
| MC09-155-A | 216.9 | 42.9 | 0.765 | 0.846 | 0.401 |

The Table below shows a heavy bulk density material (e.g., calcium carbonate) in the preferred size range included in a formula compared to a similar formula not containing the heavy bulk density material. The results show on-size yield, which is an indication of agglomeration efficiency, increases, along with particle sphericity and granule crush strength.

| Heavy Bulk Density Material | Formula Run Number | Run Number | On-Size Yield, Lbs. | Sphericity | Crush Strength, Lbs. | Wt % Heavy Bulk Density |
|---|---|---|---|---|---|---|
| N/A | S14021 | MC09-224 | 72.1 | 0.893 | 3.33 | 0.0 |
| CaCO3 | S15518 | MC11-026 | 109.3 | 0.910 | 3.40 | 15.0 |
| CaCO3 | S15518 | MC11-040 | 106.3 | 0.903 | 4.00 | 15.0 |

(D) the Controlled Release of Granules Compared to Reference Granules

Figure 2:
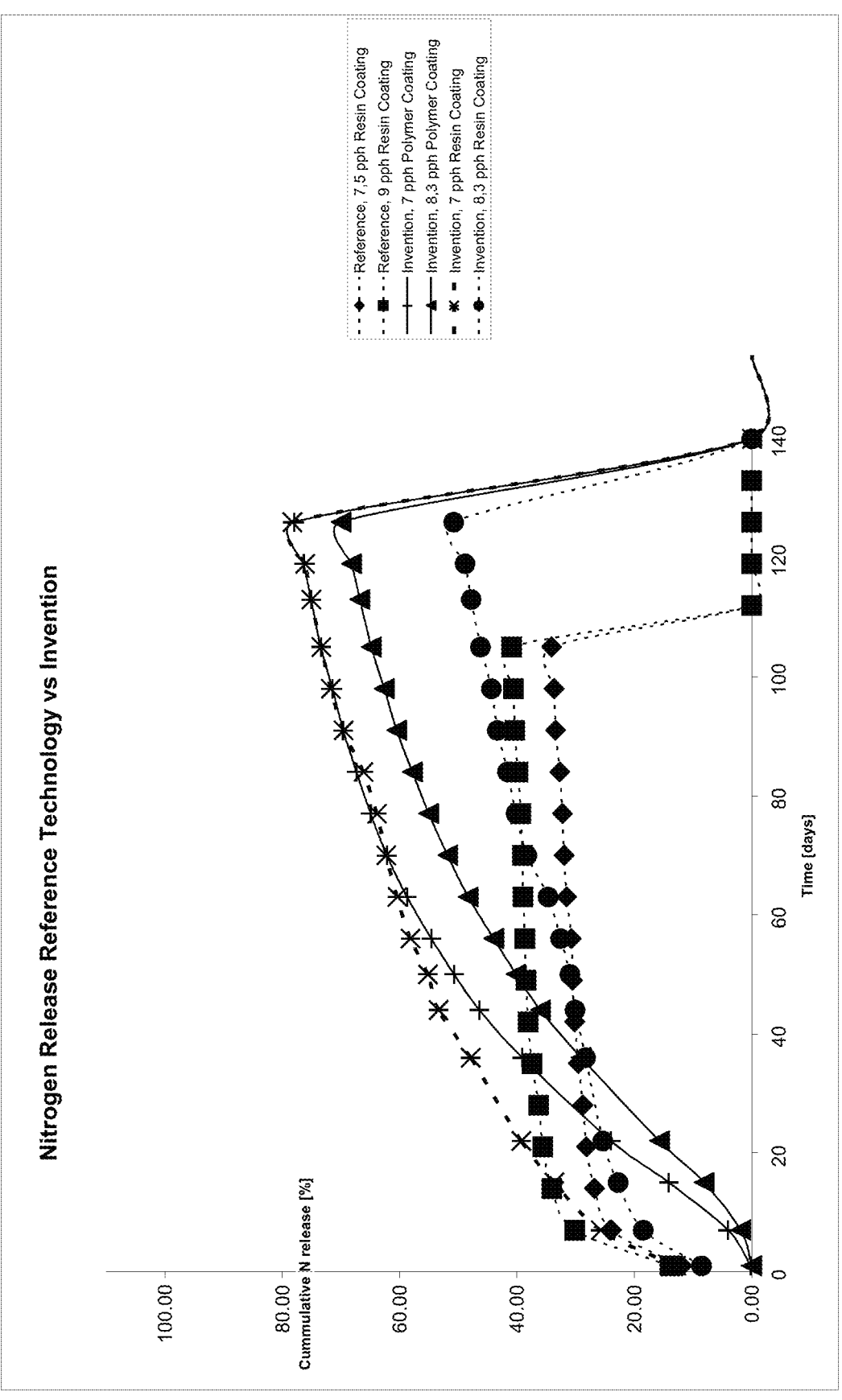
FIG. 2 depicts a graph showing the comparable release rates between the controlled release fertilizer granules manufactured using the dual binder system of the invention versus reference controlled release fertilizer granules.
Figure 3:
FIG. 3 shows the effects of in situ chelation of micronutrients.

In this example, materials produced using the methods described herein were coated with polymer resin for controlled release and their nutrient release profiles compared to similar coatings using commercially available substrates. The samples noted as "Invention" are substrates produced using methods described herein. (see FIG. 2) Samples noted as "Reference" are comparative commercially available fertilizer substrates.

Two polymer resin systems (i.e., alkyd resin or polyurethane resin) were shown in this example. Samples noted with "Resin Coating" were produced using an alkyd resin coating. Samples noted with "Polymer Coating" were produced using a polyurethane resin coating. The testing was conducted by placing the coated materials in a container (at room temperature in water or sand) and measuring the amounts of nitrogen released at specific time intervals. The results demonstrate that the "Invention" samples can be used to manufacture controlled release coatings with similar performance to the "Reference" binding systems.

(E) the in Situ Oxidation of Micronutrients.

This example shows the non-staining effect of the fertilizer with FeSO4 produced using the methods described herein. Small samples of ferrous sulfate (FeSO4), a product called MicroMax, containing micro element sulfates (e.g., iron, manganese, zinc, and copper) and a complete fertilizer granule "Kemira 17-10-13", which also contains chelated EDTA iron, were placed on a concrete block and irrigated. These samples were compared to experimental products, designated "MC09-084-A," which was produced using the inventive methods described herein. MC09-084-A was formulated with iron sulfate (FeSO4) and irrigated in the same manner. The results show that the samples that did not have chelated iron oxidized and stained the concrete block. Samples MC09-084-A and the Kemira 17-10-13 did not stain the concrete.

(F) The addition of Bulk Density Material

To determine if the granules could be improved in terms of hardness, sphericity, and/or agglomeration, bulk density materials were added to the granulation process.

Figure 6:
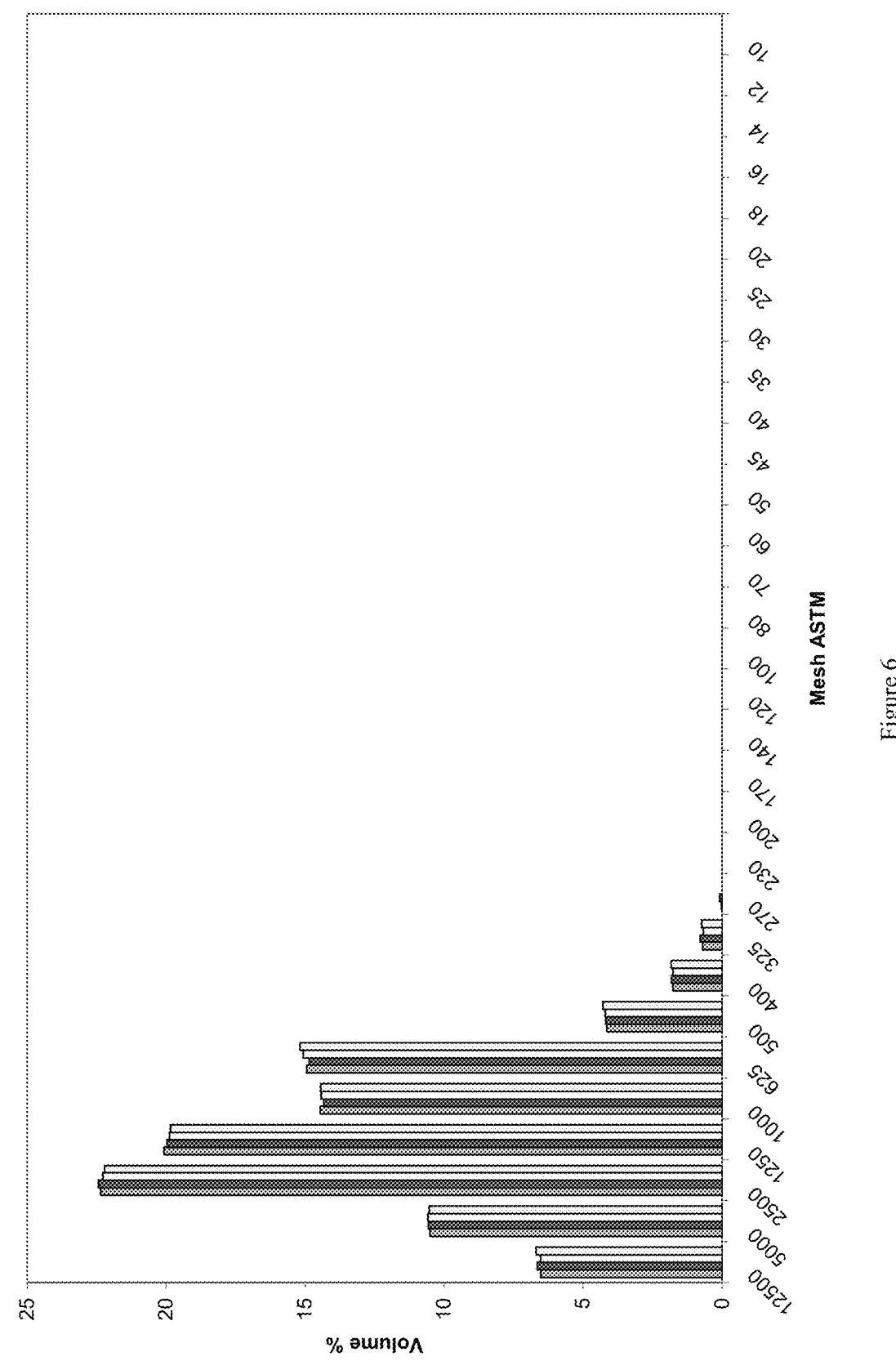
FIG. 6 shows a graph depicting preferred particle size distributions for heavy bulk density materials.
Figure 7:
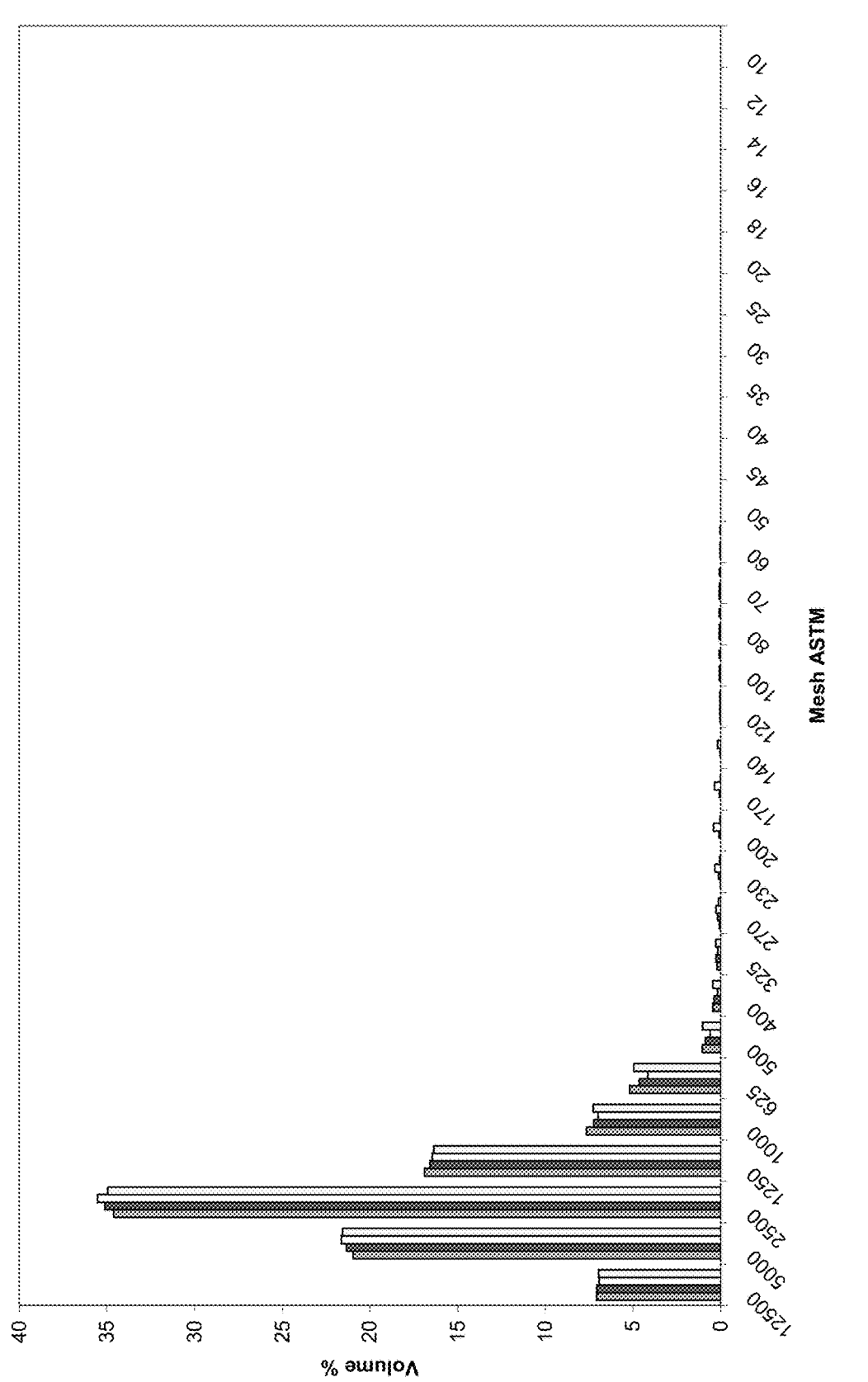
FIG. 7 shows a graph depicting preferred particle size distributions for heavy bulk density materials.
Figure 8:
FIG. 8 shows a graph depicting non-preferred particle size distributions for heavy bulk density materials.

FIGS. 6, 7 and 8 show the particle size distributions of a heavy bulk density material. The X-axis indicates the ASTM Mesh size measured in each sample, while the Y-axis indicates the weight % found in each ASTM Mesh size fraction. Each sizing test was replicated four times, as displayed with four 'bars' in each size fraction.

FIGS. 6 and 7 provide example particle size distributions for heavy bulk density materials in the preferred size range of 99% of the material less than 44 microns and 30-70% also less than 5 microns. FIG. 8 provides a heavy bulk density material with a particle size distribution with only 40% by weight of particle with a size less than 44 microns and about 9% less than 5 microns. This particles result in the granulation process requiring two times the amount of binder, compared to using the preferred particle size of heavy bulk density material.

The Table below shows the effect of 5 micron wt % versus binder solution utilization. This table shows that when the particle size distribution of the heavy bulk density material is similar to that displayed in FIG. 8, binder requirements increase by nearly 2×.

| Heavy Bulk Density Material | Formula Number | HBD -5 Micron Wt Fraction | Binder Solution% Solids, Lbs./1000 Wt. | Ligno:HSH Ratio | Granulation Yield, Lbs. On-Size Per run |
|---|---|---|---|---|---|
| CaCO3 | 62.024 | 69% | 158 | 4 | 40.3 |
| CaCO3 | 62.024 | 44% | 158 | 4 | 45 |
| CaCO3 | 62.024 | 9% | 285 | 4 | 26.8 |

(G) the all-In-One Seed Using the Novel Binding System.

As contemplated by the invention, a single granule comprising a seed, fertilizer, soil conditioning agents, micronutrients, growth enhancer, hormones, fungicides, and perlite may be used to form an all inclusive or all-in-one seed particle.

To test the ability of the novel binding system to enhance the growth of a seed, an all-in-one system comprising the novel binding system of the invention was used. The all-in-one system tested the effects of the novel binder to grow grass in either rice hulls or perlite. The other components of the all-in one seed system were kept identical with the exception of either perlite or rice hull.

Figure 4:
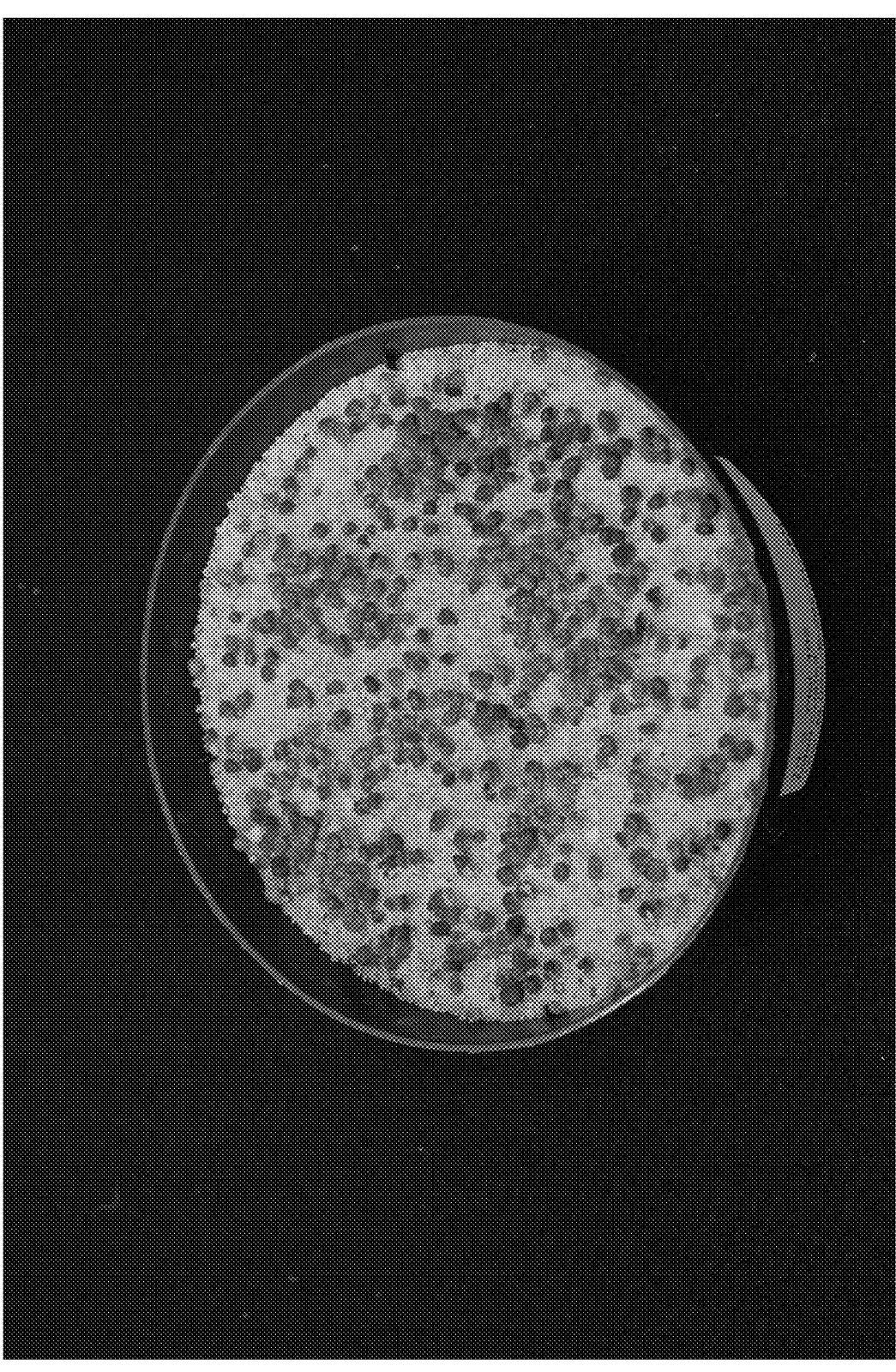
FIG. 4 shows the all-in-one seed using the novel binder and rice hull.
Figure 5:
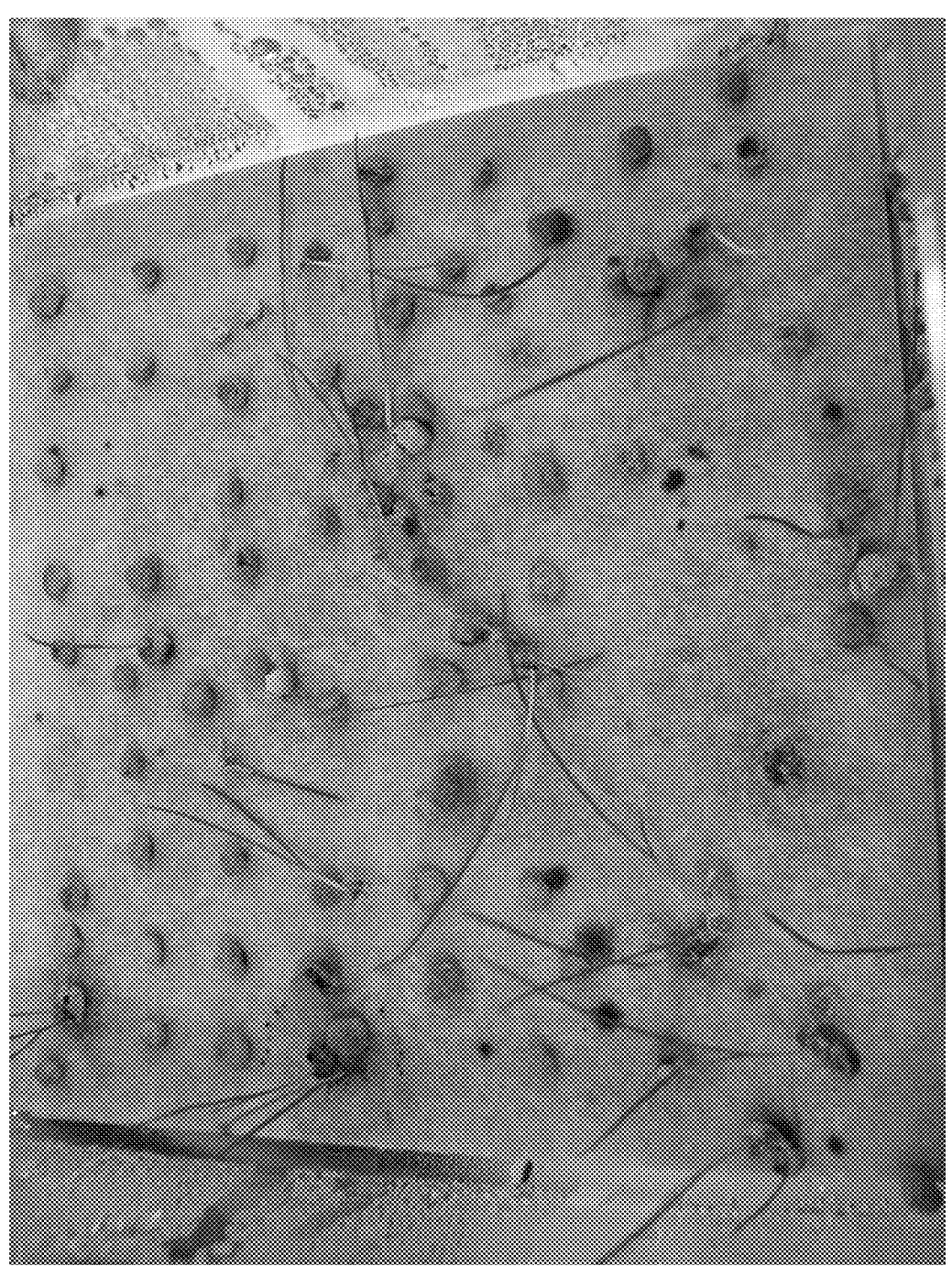
FIG. 5 shows the all-in-one seed using the novel binder and perlite.

Surprisingly, the all-in-one seeds comprising the novel binding system and perlite exhibited an increase in germination when compared to the all-in-one seed comprising the binding system and rice hulls. (see FIGS. 4 and 5). The combination of perlite and novel binder allowed sufficient air flow transmission to allow germination of the grass seed. The combination of rice hulls and novel binder did not allow sufficient air transmission to the seed and no germination could be achieved. FIGS. 4 and 5 depict this difference when attempting to germinate the granulated seed particles in controlled greenhouse or growth chamber evaluation methods.

(H) all-In-One Seed with Bulk Density Material

The perlite used in the all-in-one seed is a lighter material, typically having a bulk density ranging from 5-10 lbs./cu. ft. It is a porous and open structure allowing for air transmission to the seed. However, this structure also helps the material achieve a relatively high liquid holding capacity in the range of about 200-300% of its own weight. The ability to retain high levels of liquid helps the particle provide more water for the new seedlings as they are growing and becoming established.

During the granulation process, due to its high liquid holding capacity, perlite may adsorb significant amounts of the binder solution, described herein, potentially causing a reduction in the granulation process. The addition of more binder may seal off the open pores of the perlite, thus reducing its air transmission rate, resulting in a product with reduce seed germination rates.

In order to prevent the occurrence of reduced germination rates in the final product, bulk density materials, such as limestone, calcium carbonate, calcium sulfate, dolomite, marble, powdered granite, or combinations thereof were added to the production of the all-in-one seed.

To the components of the all-in-one seed, bulk density materials were added at a volumetric ratio of perlite to heavy bulk density material of about 1:1 to 4:1. By using this ratio, the formula achieves a balance between granule integrity, air transmission to seed, and agglomeration or 'roll-up' of seeds into the granules. This balance is achieved, while also maintaining effective seed germination rates.

All documents presented herein (e.g., patents, patent applications, non-patent literature documents) are hereby incorporated by reference in their entireties.

What is claimed is:

1. A granule comprising (i) particles comprising an active agent and (ii) a binding agent comprising a lignosulfonate and a mixture of polyols, wherein the mixture of polyols comprises monosaccharides, disaccharides and hydrogenated starch hydrolysates, and wherein the mixture of polyols is present in an amount ranging from comprises 10-20%, by weight, based on the binding agent; wherein the mixture of polyols comprises 15% or less monosaccharides, 20% or less disaccharides, and 50% or greater hydrogenated starch hydrolysates, wherein the active agent is an agriculturally active agent, a pharmaceutically active agent, or a food product, and wherein the granule has a sphericity of at least 85%.

2. The granule of claim 1, wherein the agriculturally active agent includes fertilizers, micronutrients, pesticides, seeds, or combinations thereof.

3. The granule of claim 1, wherein the agriculturally active agent is a fertilizer.

4. The granule of claim 1, further comprising a bulk density material.

5. The granule of claim 1, having an aspect ratio of greater than 0.78 and a crush resistance of at least 2.0 lbs force.

6. A binding formulation comprising a lignosulfonate; a mixture of polyols, wherein the lignosulfonate and the mixture of polyols are present in a ratio sufficient to form the granule of claim 1; and a fertilizer, wherein the fertilizer comprises nitrogen, phosphorus, potassium, micronutrients, or combinations thereof;

wherein said micronutrients include calcium, magnesium, sulfur, boron, copper, iron, chloride, magnesium, molybdenum, zinc, or combinations thereof;

wherein the mixture of polyols comprises monosaccharides, disaccharides, and hydrogenated starch hydrolysates, and wherein the mixture of polyols is present in an amount ranging from comprises 10-20%, by weight, based on the binding agent; wherein the mixture of polyols comprises 15% or less monosaccharides, 20% or less disaccharides, and 50% or greater hydrogenated starch hydrolysates, wherein a crush resistance of the granule is capable of withstanding at least 2.0 lbs force; and wherein the granule has a sphericity of at least 85%.

7. The formulation of claim 6, wherein said lignosulfonate comprises calcium lignosulfonate, sodium lignosulfonate, ammonium lignosulfonate, magnesium lignosulfonate, aluminum lignosulfonate, chromium lignosulfonate, or combinations thereof.

8. A method of making the granules of claim 1, the method comprising admixing:

(i) particles comprising an active agent and (ii) a binding agent comprising a lignosulfonate and a mixture of polyols, wherein each particle is at least 85% spherical, has an aspect ratio of 0.78, and is crush resistant at 2.0 lbs force;

wherein the particle includes fertilizers, herbicides, pesticides, micronutrients, seeds, soil conditioners, plant growth hormones, plant growth regulators, soil moisture enhancers, and wetting agents or combinations thereof; and wherein the lignosulfonate includes calcium lignosulfonate, sodium lignosulfonate, ammonium lignosulfonate, magnesium lignosulfonate, aluminum lignosulfonate, chromium lignosulfonate or combinations thereof;

wherein the lignosulfonate and mixture of polyols is premixed into a binder solution.

9. The method of claim 8, wherein the seed includes grass, vegetable, flowers, grains, or combinations thereof.

10. The granule of claim 1, wherein the mixture of polyols comprises 10% or less monosaccharides, 15% or less disaccharides, and 65% or greater hydrogenated starch hydrolysates.

11. The granule of claim 4, wherein the bulk density material has a particle size distribution with at least 99% of the material by weight having a size less than 44 μm and 30%-70% of the material by weight having a particle size less than 5 μm and greater than 1 μm.

12. The granule of claim 1, further comprising a coating selected from group consisting of a sulfur-based coating, a solvent-based polymer coating, or a water-based latex coating.

* * * * *